Patented July 16, 1940

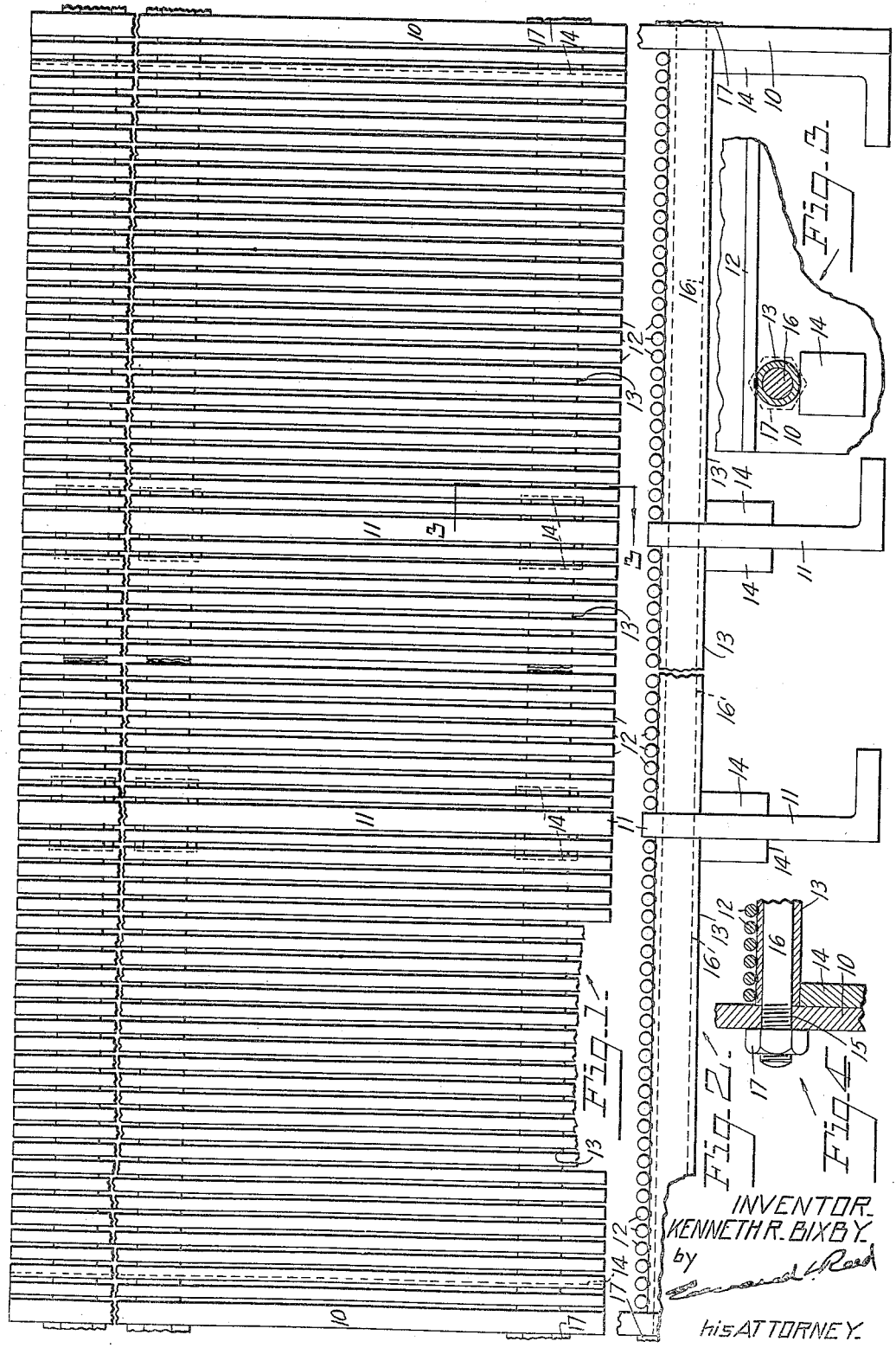

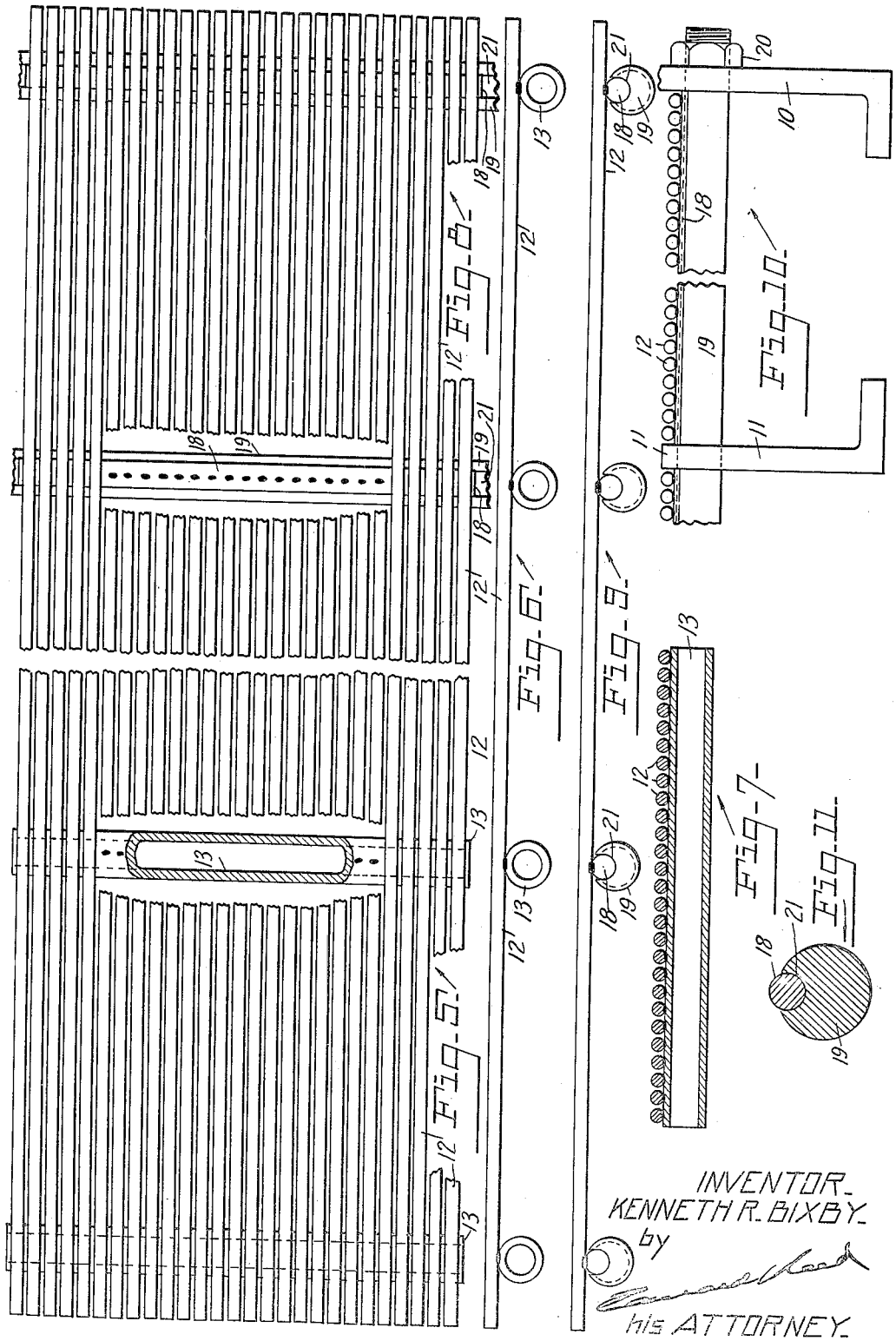

2,208,448

UNITED STATES PATENT OFFICE 2,208,448

SCREEN

Kenneth R. Bixby, Canton, Ill.

Application March 7, 1939, Serial No. 260,373

10 Claims. (Cl. 209—393)

This invention relates to a screen and more particularly to a screen designed primarily for dewatering washed coal.

It has been proposed heretofore to construct such a screen with a plurality of relatively small round screen rods extending lengthwise thereof and welded to transverse round supporting bars. Such a construction provides an excellent screen but difficulty is experienced in welding the small rods to the supporting bars, because the latter must be capable of supporting the weight of the coal on the screen rods and this has heretofore required the use of a supporting bar of relatively great thickness with relation to the screen rods. As a result the amount of heat required to effect welding fusion in the supporting bars is greatly in excess of that required to effect welding fusion in the screen rods and frequently the screen rods are weakened or seriously injured by being overheated.

One object of the invention is to provide such a screen in which the welding of the screen rods to the supporting bars may be effected without injuring the screen rods.

A further object of the invention is to provide means for properly proportioning the fusion effected by the welding heat applied to the screen rods and to the supporting bars and at the same time to provide adequate support for the screen rods.

A further object of the invention is to provide a screen comprising a plurality of screen sections of such a character that they may be easily assembled on and secured to a screen frame; and in which the upper surfaces of the screen rods will be substantially flush with the intermediate portions of the frame, so that the screen surface will be free from obstructions.

Other objects of the invention may appear as the screen is described in detail.

In the accompanying drawings Fig. 1 is a plan view, partly broken away, of a screen embodying my invention; Fig. 2 is an end elevation of the screen of Fig. 1; Fig. 3 is a section taken on the line 3—3 of Fig. 1; Fig. 4 is a detail section of portions of a screen section and the frame; Fig. 5 is a plan view of a portion of a screen embodying my invention, partly broken away and showing the supporting bar partly in section; Fig. 6 is a side elevation of the screen shown in Fig. 1; Fig. 7 is a sectional view of one of the screen sections taken lengthwise of the supporting bar; Fig. 8 is a plan view of a portion of a screen embodying a modified form of the invention, partly broken away, and showing the reinforcing bar in section; Fig. 9 is a side elevation of the screen section shown in Fig. 8; Fig. 10 is an end elevation, partly broken away, of a portion of the screen shown in Fig. 8; and Fig. 11 is a transverse section taken through the supporting bar and reinforcing bar of Fig. 8.

The invention is usually embodied in a screen comprising an inclined vibratory frame on which one or more screen sections are mounted. In the present instance the frame is adapted to receive a plurality of screen sections and comprises side members 10 and intermediate frame members 11, extending lengthwise of the frame and spaced laterally one from the other. The width of the frame and the number of intermediate frame members 11 employed depends upon the number of screen sections which are to be employed and, in the present instance, the frame is provided with three screen sections. Each screen section is constructed separately from the frame and constitutes a unit which may be, and usually is, manufactured and sold separately from the frame and may be attached to or removed from the frame at will. The screen as a whole may be provided with a single screen section or with any desired number of screen sections.

Each screen section comprises a plurality of screen rods 12 extending lengthwise of the frame and spaced laterally one from the other. These rods are preferably round in cross section as this imparts a long life to the screen due to the fact that the upper parts of the screen rods may be worn away for one-half their diameter without increasing the width of the spaces between adjacent rods. Further, when round rods are used the lower portions of the spaces between adjacent rods diverge downwardly which tends to prevent the same from being clogged by small pieces of coal. The diameter of the screen rods and the spacing thereof may vary and depends in part upon the use which is to be made of the screen. In one type of screen the rods are three-sixteenths of an inch in diameter and are spaced apart one-thirty-second of an inch. The screen rods of each screen section are supported on transverse bars to which they are welded. This supporting bar must either be of such a size that it will have sufficient strength in itself to support the weight of the material on the screen rods or it must be reinforced. When the supporting bar is of a thickness substantially greater than the thickness of the screen rods the amount of heat required to effect welding fusion in the supporting bar is so great as to frequently injure or weaken the screen rods. To overcome this objectionable feature and enable the welding fusion to be properly proportioned between the screen rods and the supporting bars I have provided a supporting bar of such a character that that portion thereof which contacts with the screen rods will be of such thickness with relation to the screen rods that approximately the same amount of heat will be required to effect welding fusion in both the bar and the rod. This may be accomplished in various ways and for the purpose of illustration I have shown two forms of supporting bar. As shown in Figs. 1 to 7, the supporting bar 13 is tubular in form and the wall thereof is of such thickness that when the electrode arm of a spot welding machine is contacted with the tubular bar and welding effected the heat will be distributed substantially equally between the contact portion of the bar and the screen rod. The distribution of the heat may vary in accordance with the character of the metal employed. For example, in a de-watering screen it is preferable that the screen rods should be made of stainless steel and a stainless steel rod cannot stand the same amount of heat that other steel rods will stand, without changing the structure and properties of the metal. Therefore under such circumstances the heat would be so distributed as to effect the major portion of the fusion in the supporting bar and the smaller portion thereof in the screen rod. The tubular supporting bars may be of any desired size and shape and may be made of such a size that they will have sufficient strength to support the load on the screen rods without reinforcement. Preferably these supporting bars are round in cross section as this provides a relatively narrow arcuate surface which has tangental contact with the round screen rod, so as to provide a relatively small welding area which is located wholly in the space between the rod and the bar and does not project into the space between adjacent rods. Further, the upper side portions of the round bar diverge downwardly so that they do not seriously obstruct the passage of small pieces of coal or the like through the spaces between the rods and above the supporting bars.

The supporting bars may be mounted on and secured to the frame structure in any suitable manner but preferably they are of a length substantially equal to the distance between the frame members between which the screen section is located and they are supported at their ends on abutments 14 carried by the frame members. In order to positively secure the supporting bars, and therefore the screen sections, in position between the frame members, and to tie the several screen sections together when a plurality of screen sections are used, the frame members are provided with openings 15 adjacent the ends of the supporting bars 13 and rods 16 are inserted through the frame members and the tubular supporting bars and rigidly secured in the frame member. In the present instance the rods 16 are provided on their ends, outside the side members 10, with nuts 17, or other suitable fastening devices, whereby the bars 16 are secured in the frame members and the latter are pressed tightly against the ends of the supporting bars so as to clamp the supporting bars firmly between the frame members. When the supporting bars are thus rigidly secured to the frame members they maintain the screen rods under longitudinal tension which results in a high frequency vibration being set up in the screen rods during the screening operation which tends to prevent the clogging of the screen. The bars 16, which will be hereinafter referred to as reinforcing bars, have three functions: first, they serve as tie rods to tie the several screen sections one to the other and to the frame members; second, they serve as tensioning devices to maintain the screen rods under tension; and, third, they serve as reinforcing members for the supporting bars. When the tubular supporting bars are used, as in Figs. 1 to 7, these bars may be of such size as to provide ample strength to support the load on the screen rods and therefore the reinforcing function of the bars 16 is not always necessary, although it may be present in the construction. Therefore, the use of the reinforcing bars is not essential to the use of the tubular supporting bars and, if desired, and particularly in small size screen sections, the tubular supporting bar may be used alone and secured to the frame members in any desired manner.

The several screen sections are separated one from the other by the intermediate frame members 11 and these frame members are arranged with their upper edges substantially flush with the upper surfaces of the screen rods, thus providing the screen as a whole with an unobstructed screen surface extending across the full width thereof, and inasmuch as the intermediate frame members are formed of thin material they do not materially restrict the actual screening area of the screen.

In Figs. 8 to 11, I have illustrated a modified construction in which the supporting bars for the screen rods 12 are shown in the form of round bars 18 of a diameter not greatly in excess of the diameter of the screen rods 12, so that in the welding operation the supporting bar will not require much more heat to effect welding fusion than does the screen rod. While the supporting bar 18 is shown as round in cross section it may be of any suitable shape. This supporting bar is also of a length substantially equal to the distance between adjacent frame members and is connected with said frame members by a bar 19 which is arranged in reinforcing relation thereto and which extends through and is secured to the frame members in any suitable manner, as by nuts 20, applied to the ends of the reinforcing bar 19 and serving to clamp the supporting bars tightly between the respective frame members. The reinforcing bar 19 has the same functions as the reinforcing bar 16 and may be of any suitable construction which will enable it to have reinforcing connection with the supporting bar 18. Preferably it is provided in the upper part thereof with a longitudinal groove 21 adapted to receive and form a seat for the supporting bar or bars 18. Thus while the supporting bar 18 is of relatively small diameter it is strongly reinforced by the bar 19 so as to provide ample support for the screen rods.

In both forms of the apparatus the supporting bars and the cooperating reinforcing bars are arranged in telescoping relation one to the other, so that the screen sections, with the supporting bars welded to the screen rods, may be placed in their proper positions between the respective frame members and the reinforcing bars then moved longitudinally through the openings in the frame members and into telescoping relation to the supporting bars, thus enabling a plurality of screen sections to be very quickly assembled and accurately positioned on the screen frame.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent, is:

1. A screen section comprising a plurality of rods spaced laterally one from the other and a plurality of transverse supporting structures arranged beneath said rods, each supporting structure including two bars having interengaging parts to hold the same against relative lateral displacement, one of said bars being in contact with and welded to said rods, the contacting portions of said bar being of such thickness with relation to said rods that the fusion effected by the welding heat will be properly proportioned between said bar and the respective rods, and one of said bars having at its ends means for connecting the same with a screen frame.

2. A screen section comprising a plurality of rods spaced laterally one from the other and a plurality of transverse supporting structures arranged beneath said rods, each supporting structure including two substantially parallel bars, one of said bars being in contact with and welded to said rods and having its ends adjacent to the outermost rods at the respective sides of said screen section, the contacting portions of said bar being of such thickness with relation to said rods that the fusion effected by the welding heat will be properly proportioned between said bar and the respective rods, and the other of said bars extending beyond the ends of the first mentioned bar for connection with a screen frame and being connected with said first mentioned bar to reinforce the latter and to hold the two bars against relative lateral displacement.

3. A screen section comprising a plurality of rods spaced laterally one from the other and a plurality of transverse supporting structures arranged beneath said rods, each supporting structure including two bars, one of said bars having a longitudinal opening through which the other bar extends, and one of said bars having contact with and being welded to said rods, those portions of the last mentioned bar which contact with said rods being of such thickness with relation to said rods that the fusion effected by the welding heat will be properly proportioned between said bar and the respective rods and the other bar having means for connecting the same with a screen frame.

4. A screen section comprising a plurality of rods spaced laterally one from the other and a plurality of transverse supporting structures arranged beneath said rods, each supporting structure including two substantially parallel bars, one of said bars being in contact with and welded to said rods, the contacting portions of said bar being of such thickness with relation to said rods that the fusion effected by the welding heat will be properly proportioned between said bar and the respective rods, said bars having means for connecting the same one with the other after the first mentioned bar has been welded to said rods, and the other of said bars having means for mounting the same on a screen frame.

5. A screen section comprising a plurality of rods spaced laterally one from the other and a plurality of transverse supporting structures arranged beneath said rods, each supporting structure including two substantially parallel bars, one of said bars being in contact with and welded to said rods and having its ends adjacent to the outermost rods at the respective sides of said screen section, the contacting portions of said bar being of such thickness with relation to said rods that the fusion effected by the welding heat will be properly proportioned between said bar and the respective rods, said bars being connected one with the other in reinforcing relation and being held against relative movement transversely to their length, and means for so connecting the other bar with a screen frame that said rods will be maintained in longitudinal tension.

6. A screen section comprising a plurality of rods spaced laterally one from the other, a plurality of transverse supporting structures beneath said rods and each including a tubular bar arranged in engagement with and welded to said rods, said tubular bar having a wall of such thickness with relation to the thickness of said rods that the fusion effected by welding heat will be properly proportioned between said bar and the respective rods, and a second bar mounted in said tubular bar with its ends extending beyond the ends of the latter for connection with a screen frame.

7. A screen section comprising a plurality of rods extending lengthwise thereof and spaced laterally one from the other and a plurality of transverse supporting structures beneath said rods and each including a bar arranged in contact with and welded to said rods, the contact portions of said bars being of such thickness with relation to said rods that the fusion effected by welding heat will be properly proportioned between said bars and the respective rods, and a second bar arranged beneath the first mentioned bar and having a longitudinal groove to receive the first mentioned bar and also having means for connecting the same with a screen frame.

8. A screen section adapted to be mounted in a frame and comprising a plurality of screen rods substantially round in cross section, extending lengthwise of said frame and spaced laterally one from the other, transverse supporting bars arranged beneath said screen rods and having arcuate surfaces contacting with and welded to said screen rods, the contacing portions of said supporting bars being of such thickness with relation to said screen rods as to properly proportion the welding fusion between the screen rods and the supporting bars, and other bars arranged in telescoping relation to the respective supporting bars and extending beyond the ends of said supporting bars for connection with said frame.

9. A screen sectin adapted to be mounted in a frame, a plurality of screen rods substantially round in cross section, extending lengthwise of said frame and spaced laterally one from the other, transverse supporting bars arranged beneath said screen rods and having arcuate surfaces contacting with and welded to said screen bars, said supporting bars being of such thickness with relation to the thickness of said screen rods that the welding fusion will be properly proportioned between the screen rods and the supporting bars, and other bars having longitudinal grooves to receive the respective supporting bars and extending beyond the ends of the latter for connèction with said frame.

10. In a screen of the character described, a frame having a plurality of longitudinal members extending lengthwise thereof and spaced apart, a plurality of screen sections arranged respectively between adjacent frame members, each screen section comprising a plurality of screen rods extending lengthwise of said frame and spaced laterally one from the other, and transverse supporting bars arranged in supporting contact with and welded to said screen bars, the contacting portions of said supporting bars being of such thickness with relation to said screen rods as to properly proportion the welding fusion between the screen rods and the supporting bars, and other bars arranged in telescoping relation to the respective supporting bars, extending across the full width of said frame and secured to said longitudinal frame members.

KENNETH R. BIXBY.